United States Patent [19]
Bolinger et al.

[11] 3,827,540
[45] Aug. 6, 1974

[54] CLUTCH AND IGNITION INTERLOCK

[75] Inventors: John F. Bolinger; Douglas B. Leathem, both of Michigan City, Ind.

[73] Assignee: Meridian Industries, Inc., Southfield, Mich.

[22] Filed: Aug. 17, 1972

[21] Appl. No.: 281,354

[52] U.S. Cl. .............................. 192/.084, 74/850
[51] Int. Cl. ............................................ B60k 21/00
[58] Field of Search ............ 192/.084, .033; 74/850, 74/878

[56] References Cited
UNITED STATES PATENTS
3,521,612  7/1970  Santi et al. ..................... 74/850 X
3,726,265  4/1973  Howard ........................... 74/850 X

*Primary Examiner*—Benjamin W. Wyche
*Attorney, Agent, or Firm*—Reising, Ethington & Perry

[57] ABSTRACT

An interlock circuit is provided for use with machines to prevent starting of the prime mover unless an interlock switch is in a safe condition. In the illustrative embodiment the interlock circuit is adapted to prevent starting of the engine of a lawn tractor unless the clutch thereof is disengaged. After the engine is started the clutch may be engaged without killing the engine. The circuit comprises a controlled rectifier connected across the magneto primary coil through a rectifier. The voltage pulses applied across the output of the controlled rectifier are also applied to the gate thereof through a capacitor in a charging circuit which includes the input of the controlled rectifier. The interlock switch is connected across the input of the controlled rectifier and when it is opened, as by engagement of the clutch, the applied voltage pulses to the input of the controlled rectifier through the charging circuit causes the controlled rectifier to conduct on each pulse. Accordingly the ignition system is disabled and the engine cannot be started. When the interlock switch is closed the input of the controlled rectifier is short circuited and the controlled rectifier cannot be turned on; hence the ignition voltage is unaffected and the engine can be started. After the engine is started the clutch may be engaged and the interlock switch opened without killing the engine because the discharging circuit of the capacitor is altered so that the capacitor does not discharge sufficiently between pulses to take sufficient charging current to turn on the controlled rectifier.

9 Claims, 2 Drawing Figures

CLUTCH AND IGNITION INTERLOCK

This invention relates to interlock circuits and more particularly to a solid state circuit adapted to disable a device from normal operation unless certain conditions are met.

There has been an increasing demand for the use of safety devices in connection with machines which can be hazardous to the operator or other persons during certain operating conditions. A prime example of such machines is a lawn tractor adapted for different power attachments or tools, such as a rotary lawn mower blade. For safety purposes it is desired that such machines be disabled to prevent starting of the engine when either the traction clutch or the attachment drive clutch is engaged. However, it is necessary for the safety device to function so as to permit the engagement of the clutch after the engine is started without killing the engine. In general, the problem is to prevent starting of a prime mover, such as an engine or motor, so long as a hazardous driven member is operatively connected therewith, but to permit starting when the driven member is disconnected and to permit connection of the driven member after the prime mover is started.

Heretofore it has been proposed to provide an ignition interlock especially adapted for engine driven vehicles such as riding lawn mowers and tractors and which operates to kill the ignition voltage unless the power clutch is disengaged. A particular prior art system utilizes connection from the magneto primary coil through a clutch actuated switch and through a relay switch to ground so that the ignition voltage is shorted when the clutch is engaged and the engine is not running. More specifically, the clutch actuated switch is closed when the clutch is engaged and the relay has its coil connected across the magneto primary winding and the normally closed contacts of the relay are opened when the coil is energized by the ignition pulses. In this arrangement the engine cannot be started unless the clutch is disengaged to open the interlock switch. After the engine is started the relay switch will open so that the clutch can be engaged and the interlock switch reclosed thereby without killing the ignition and stopping the engine. A disadvantage of this arrangement is that the interlock is open when the clutch is disengaged and therefore broken wires or other defects that open the circuit falsely simulate a safe condition.

It has also been proposed in the prior art that a safety interlock be provided by use of a clutch actuated interlock switch for grounding the ignition voltage when the clutch is engaged through a speed sensitive switch connected with the engine. In this arrangement the engine can be started with the clutch disengaged and after the speed sensitive switch is opened in response to the engine speed, the clutch can be engaged without killing the engine. Such interlock systems, which are dependent upon speed sensing, can be defeated on certain engines such as rewind starter engines with a manual pullrope because the engine can be rotated by the manual starter at a speed in excess of that at which the engine should run with the clutch engaged.

In accordance with the present invention an interlock circuit is provided which avoids the need for electromechanical switching. This is accomplished by utilizing solid state circuitry for all components of the interlock system except some mechanical switches may be required for the interlock switches themselves. Accordingly, the inventive interlock system is especially well adapted to the rugged environment including dirt and vibration encountered in the operation of tractors, lawn mowers and the like. Additionally, the system permits starting only with an interlock switch closed and therefore an open circuit due to a circuit defect will not permit starting.

Also in accordance with this invention, an interlock system is provided which is independent of the speed of operation of the engine or other machine which it controls. This is accomplished by providing means which will retain a given condition if starting is attempted with the interlock switch in a safe condition and the given condition will prevent disablement of the engine if the interlock switch is subsequently switched to its other condition by clutch engagement.

In general, the invention is carried out by an electrically actuated switch connected with a source of voltage pulses such as a magneto primary to disable the source when the switch is in a first condition. A capacitor is provided with a charging circuit and is connected across the source with the input of the electrically actuated switch such as a controlled rectifier so that the signal developed by the charging circuit from each voltage pulse operates the switch to disable the source upon the occurrence of each pulse. A discharging circuit for the capacitor including the output of the switch, allows substantially complete discharge of the capacitor between voltage pulses. The input of the electrically actuated switch is connected by an interlock switch which in one condition prevents actuation of the electrically actuated switch and when the interlock switch is in said one condition it is effective to remove the electrically actuated switch from the discharging circuit. As a result of the interlock switch being in said one condition, the charging current is reduced and the signal applied to the input of the electrically actuated switch is insufficient to switch it to its first condition. Accordingly, the interlock switch may be actuated, as by engagement of a clutch, to said one condition without disabling the source after the occurrence of a few voltage pulses with the interlock switch in its said one condition.

A more complete understanding of this invention may be obtained from the detailed description that follows, taken with the accompanying drawings in which.

Figure 1:
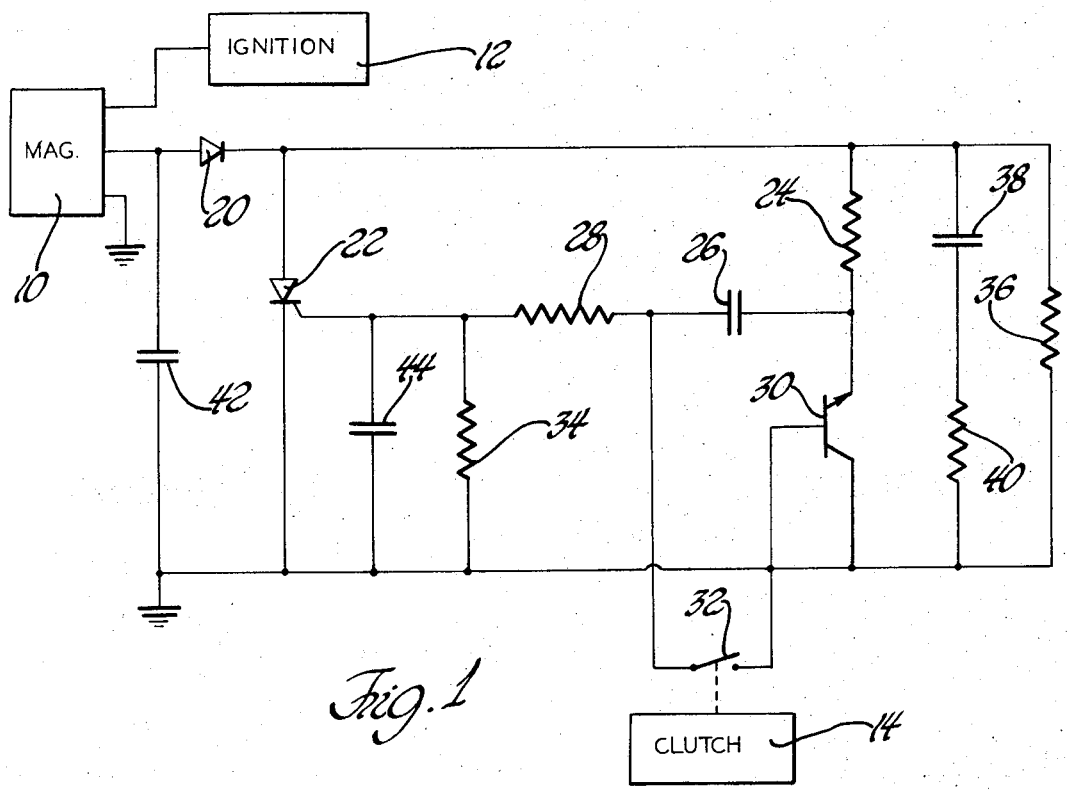
FIG. 1 is a schematic diagram of the inventive interlock circuit.

Referring now to the drawings, there is shown an illustrative embodiment of the invention in an interlock circuit especially adapted for use with a spark ignited engine. The engine, not shown in the drawings, in the illustrative embodiment is suitably the prime mover for a machine such as a lawn tractor. In such an application of the invention the interlock circuit is adapted to prevent starting of the engine unless the power coupling, i.e. a clutch, between the engine and the traction wheels or other load device is disengaged. In the illustrative embodiment the spark ignited engine uses a magneto ignition system, although it will be apparent that the invention is readily applicable to other forms of ignition systems.

FIG. 1 shows the inventive interlock circuit adapted for connection with an engine having a magneto ignition system with a negative ground. The ignition voltage source or magneto 10 has its primary coil connected with the ignition circuit 12 including the breaker points, condenser and spark plug of the engine. The primary coil of the magneto 10 which delivers periodic voltage pulses corresponding to the rotating speed of the engine, is connected to the input of the interlock circuit, to be described presently. The negative terminal of the magneto is connected to ground. The power train of the engine includes a clutch 14 adapted to mechanically couple the engine to the traction wheels when it is engaged.

The interlock circuit includes a diode rectifier 20 having its anode connected to the primary coil of the magneto, blocking the negative portions of the magneto voltage and passing the positive pulses thereof. An electrically actuated switch 22, preferably a controlled rectifier of the semiconductor type such as a silicon controlled rectifier, is connected with its output circuit across the source of voltage pulses with the anode connected to the diode 20 and the cathode connected to ground. The positive voltage pulses from the diode 20 are applied to a capacitor charging circuit which includes a resistor 24, capacitor 26 and resistor 28 to the input, i.e. the gate to cathode circuit of the controlled rectifier 22.

In order to limit the voltage across the capacitor 26 a voltage limiting device in the form of a transistor 30 operated as a Zener diode, is connected from capacitor 26 to ground. For this purpose the transistor 30 is of the NPN type and has its emitter connected to the junction of resistor 24 and capacitor 26 and has its collector and base connected to ground.

In order to prevent the controlled rectifier 22 from being switched on in response to positive pulses from the magneto an interlock switch 32 of the mechanically actuated type is also connected in the capacitor charging circuit and is adapted to short circuit the input of the controlled rectifier 22. For this purpose the switch 32 is connected between ground and the junction of resistor 28 and capacitor 26. The interlock switch 32 is mechanically coupled to the clutch 14 for actuation thereby to the open position when the clutch is engaged.

A discharge circuit for the capacitor 26, when the controlled rectifier 22 is turned on, extends through the resistor 24, the parallel combination of the output of the controlled rectifier and a resistor 36, thence through a resistor 34 and the resistor 28. (This discharge circuit for the capacitor 26 with controlled rectifier 22 turned on may be traced from the right-hand side of the capacitor 26 through the resistor 24, through the controlled rectifier 22 and thence through resistors 34 and 28 to the left-hand side of capacitor 26; the discharge circuit includes another branch which may be traced from the right-hand side of the capacitor 26 through the resistor 24, through resistor 36 and thence through resistors 34 and 28 to the left-hand side of the capacitor 26. It can be seen that the branch through resistor 36 is in parallel with the branch through controlled rectifier 22 and the two branches merge at resistor 34 and the circuit then continues through resistor 28 to the capacitor 26.) When the controlled rectifier 22 is turned off a discharge circuit for the capacitor 26 extends through the resistor 24, the resistor 36, resistor 34 and resistor 28.

An additional capacitor 38 is connected in series with a resistor 40 across the source of voltage pulses and is charged on each pulse toward the peak value thereof. As will appear subsequently, the capacitor 38 tends to sustain the voltage across capacitor 26 and also tends to immunize the interlock circuit against high frequency noise voltages which may appear on the magneto primary coil. A filter capacitor 42 is connected across the primary coil of the magneto and another filter capacitor 44 is connected across the input of the controlled rectifier 22 for the purpose of bypassing noise voltages which might otherwise turn on the controlled rectifier.

In operation, the inventive interlock circuit permits starting of the engine when the interlock switch 32 is in its safe position, i.e., when the clutch 14 is disengaged and the switch 32 is closed thereby. The interlock circuit permits the clutch to be engaged and the interlock switch 32 to be opened after the engine is started without disabling the ignition and killing the engine. However, the circuit prevents starting of the engine by disabling the ignition when the clutch is engaged and the interlock switch 32 is open. The operation of the circuitry to achieve these results will now be described.

Assuming that the operator attempts to start the engine with the clutch 14 engaged, the interlock switch 32 will be open, as shown in the diagram of FIG. 1. In this condition during the attempt at starting the voltage pulses from the primary coil of the magneto 10 will be applied across the output of the controlled rectifier 22 and will also be applied across the charging circuit for the capacitor 26. This charging circuit extends through a series connection of the resistor 24, capacitor 26, resistor 28 and the input of the controlled rectifier 22. Upon the occurrence of the first voltage pulse the capacitor 26, being in a discharged state, will commence charging toward the peak value of the voltage pulse and the charging current which flows through the input of the controlled rectifier 22 will be sufficient to turn on the controlled rectifier. It is noted that the resistor 34 is sufficiently high so that the current drawn thereby does not reduce the gate current of the controlled rectifier below its turn-on value under the stated conditions. When the controlled rectifier 22 turns on the voltage pulse from the magneto primary winding is short circuited to ground and accordingly the secondary coil of the magneto does not develop an ignition pulse. Prior to the succeeding pulse from the magneto primary coil the capacitor 26 is substantially fully discharged through the resistor 24, the output of the controlled rectifier 22, and the resistors 34 and 28. Upon the occurrence of the succeeding pulse from the magneto primary coil the circuit operation is the same so long as the clutch 14 is engaged and the interlock switch 32 is open. With the clutch and the interlock switch in this condition the engine cannot be started because the ignition voltage source is disabled by the controlled rectifier 22 which is turned on by each pulse.

Further, in operation of the circuit, the engine will be permitted to start with the clutch 14 disengaged and the interlock switch 32 closed thereby. In this condition the voltage pulses from the magneto primary coil are applied across the output of the controlled rectifier 22. However, the voltage pulses are not applied to the input of the controlled rectifier because of the short circuit thereacross provided by the closed interlock switch 32. (The input of the controlled rectifier 22, of course, extends between the gate and cathode thereof. The input circuit may be traced from ground through the magneto primary winding and thence through diode 20, resistor 24, capacitor 26, resistor 28 to the gate and thence the cathode of controlled rectifier 22 from which it continues to ground. Of course, there are other circuit elements such as capacitor 44 and resistor 34 connected with the input circuit of the controlled rectifier 22 and are operative to perform the functions previously noted. The interlock switch 32 extends to ground from the juncture of resistor 28 then capacitor 26 as previously described. The input signal for the controlled rectifier 22 originates with the primary winding of the magneto 10 and is effective when the interlock switch 32 is open to cause current flow in the input circuit just described. However, when the interlock switch 32 is closed, it provides a short circuit path to ground from the juncture of resistor 28 and capacitor 26. Thus the input signal current passes directly to ground at this juncture rather than passing through the gate-cathode of the controlled rectifier 22.) A charging circuit for the capacitor 26 extends through the resistor 24 and a capacitor 26 and the interlock switch 32 to ground. (With the interlock switch 32 closed, the charging circuit for the capacitor 26 may be traced from ground through the primary winding of magneto 10, through diode 20, resistor 24, capacitor 26 and thence through the closed switch 32 to ground.) Accordingly, the capacitor is charged toward the peak value of each voltage pulse but it is limited to a lesser value by the breakdown of the Zener diode formed by the emitter to collector circuit of the transistor 30. Before the occurrence of the succeeding pulse the capacitor 26 will discharge a relatively small amount through the discharging circuit which includes resistors 24, 36, 34 and 28. It is noted that the output of the controlled rectifier 22, which was not switched on by the applied voltage pulse, is removed from the discharging circuit for the capacitor 26 and accordingly the amount of discharge is small compared to what it would be with the controlled rectifier turned on. Furthermore, during the applied voltage pulse the capacitor 38 was charged toward the full peak value of the voltage pulse and as the pulse subsides the capacitor 38 recharges capacitor 26 toward the limiting value established by the transistor 30. Consequently, the charge on capacitor 26 tends to remain substantially constant between applied voltage pulses. Upon the occurrence of the succeeding pulse with the interlock switch 32 remaining in the closed position, the operation of the circuit just described will be repeated with even a lesser amount of current to the capacitor 26 through the charging circuit. Accordingly, during this starting attempt with the interlock switch closed the controlled rectifier 22 will remain turned off and the interlock circuit will have no disabling effect on the ignition voltage source and the engine will start.

After the engine is started the clutch 14 may be engaged and hence the interlock switch 32 opened, without killing the engine. This operation obtains because the capacitor 26 retains a high degree of charge between pulses, i.e., after the first few applied pulses, typically 2 or 3 pulses, so that the charging current drawn thereby through the input of the controlled rectifier from the succeeding applied voltage pulse is too small to turn on the controlled rectifier. Thus, it is no longer necessary, even after the first applied voltage pulse with the interlock switch closed, to keep it closed in order to keep the engine running. It is noted that after the engine is turned off the capacitor 26 will discharge through resistors 24, 36, 34 and 28 and the time constant thereof must be small enough so that the capacitor will be sufficiently discharged before another restarting attempt could be made, so that the charging current from the first applied voltage pulse will be of sufficient value through the input of the controlled rectifier to turn the controlled rectifier on and thereby prevent engine starting. The time constant of this circuit however must be large enough so that the charge retained by the capacitor 26 between applied voltage pulses with the interlock switch 32 open and the engine running, so that the charging current from the applied voltage pulse will be too small through the input of the controlled rectifier to turn on the controlled rectifier and thereby kill the engine.

The interlock circuit is rendered substantially immune to noise voltage pulses by the provision of filter capacitors 42 and 44, both of which tend to bypass high frequency noise pulses and thus minimize the chance that the controlled rectifier will be unintentionally turned on. The capacitor 38 also tends to bypass high frequency noise pulses to further reduce the chance of unintentional switching.

Figure 2:
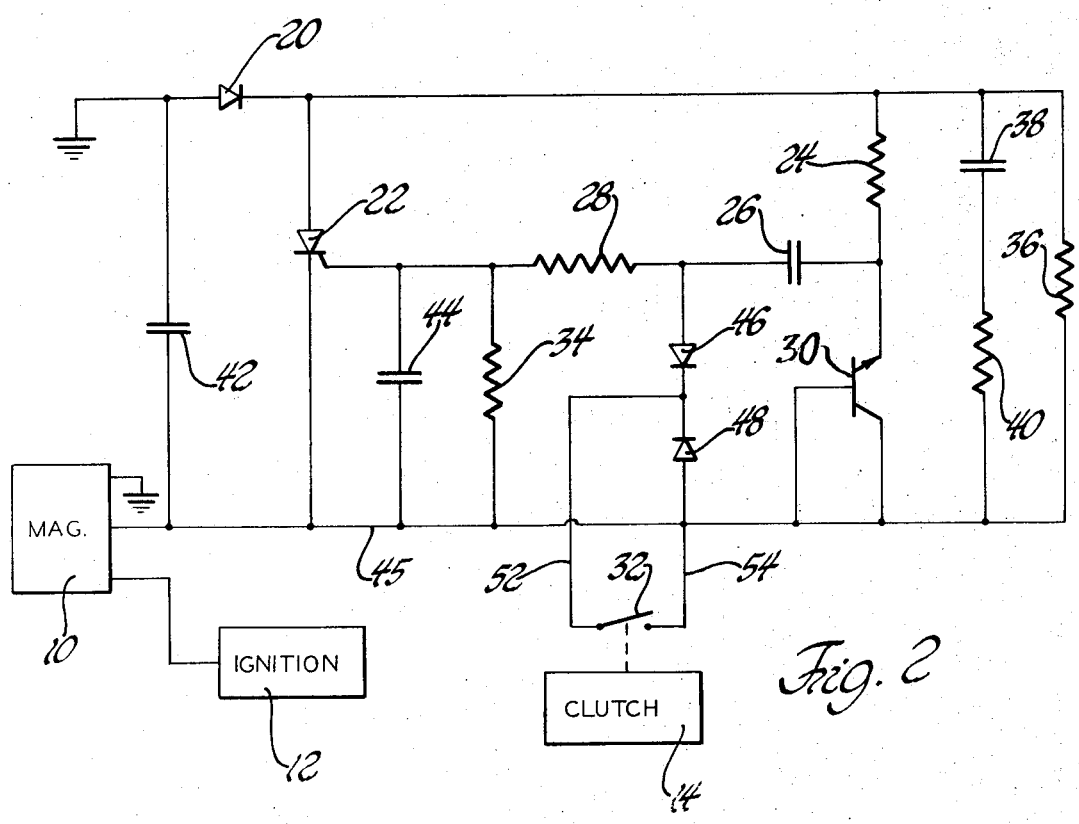
FIG. 2 is a schematic diagram of a modification of the inventive interlock circuit.

A modification of the inventive circuit is shown in FIG. 2 in order to adapt the circuit for operation with a magneto ignition system having a positive ground. In this connection it is noted that the magneto 10 has the grounded end of its primary coil connected to the anode of the diode rectifier 20, while the other terminal of the coil is connected to the common conductor 45. By the same token the ungrounded terminal of the secondary coil of the magneto is connected to the ignition circuit 12. The remainder of the interlock circuit remains the same as described with reference to FIG. 1, except that special provision is made to protect the circuit in case of accidental grounding of the leads of the interlock switch 32. For this purpose diode rectifiers 46 and 48 are connected back to back with the cathodes together between the junction of capacitor 26 and resistor 28 and the common conductor 45. The interlock switch 32 is connected between the cathodes of the diode rectifiers 46 and 48 and the common conductor 45. If the switch conductor 54 is accidentally grounded there will be no current flow to the remainder of this circuit except for the dead short between the positive terminal of the primary coil and the common conductor 45. However, protection for the circuit components is required when the switch conductor 52 is accidentally grounded. The magneto primary coil develops an alternating voltage on the primary coil and the diode rectifier 20 passes only the positive pulses, i.e., when the ground terminal is positive and the common conductor 45 is negative. The positive pulses, even when conductor 52 is accidentally grounded, are not damaging to the circuit components; the negative pulses, however, may damage the capacitor 26 or transistor 30 without the protection of rectifiers 46 and 48. A negative pulse, i.e., when the ground terminal is negative and conductor 45 is positive, would produce an excessive current surge through transistor 30 and capacitor 20 except for the fact that rectifier 48 provides a shunt path to the accidental ground and carries the short circuit current and the rectifier 46 blocks the current flow from the remainder of the circuit. Thus the rectifiers 46 and 48 steer the short circuit currents to protect the circuit against damage in the event of accidental grounding of the leads of switch 32. The operation of the modified circuit of FIG. 2 is identical in every other respect to the operation of the circuit of FIG. 1 as previously described.

Although the description of this invention has been given with respect to a particular embodiment, it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. An ignition interlock circuit for a spark ignited engine having a source of ignition voltage pulses and power coupling means, said circuit comprising: an electrically actuated switch having a normally open output connected across the source and having an input responsive to a predetermined value of current for closing the switch output to short circuit the ignition voltage, a capacitor, a charging circuit including the input of said switch connected in series with the capacitor across the source, the charging current for the capacitor exceeding said predetermined value and closing said switch output, a discharging circuit for said capacitor including said switch output to discharge said capacitor between voltage pulses, a mechanically actuated switch connected with said power coupling means and being closed thereby when the power coupling means is disengaged, said mechanically acutated switch being electrically connected across the input of the electrically actuated switch to short circuit it and prevent closing of the output of the electrically actuated switch thereby enabling the source to deliver ignition voltage pulses to the engine, the output of said electrically actuated switch being removed from said discharging circuit when the mechanically actuated switch is closed to reduce the discharging of said capacitor between voltage pulses, the charging current for said capacitor being thereby reduced to less than said predetermined value whereby the power coupling means may be engaged and the mechanically actuated switch opened thereby without causing the electrically actuated switch to short circuit the ignition voltage after starting the engine with the mechanically actuated switch closed.

2. The invention as defined in claim 1 wherein said electrically actuated switch is a controlled rectifier of the semiconductor type.

3. The invention as defined in claim 2 wherein said source of ignition voltage pulses is a magneto and wherein said circuit includes a diode rectifier connected in series with the output of the controlled rectifier across the source, said rectifiers being connected with the same polarity.

4. The invention as defined in claim 3 including voltage limiting means connected across said charging circuit for limiting the voltage on said capacitor to a predetermined maximum value.

5. The invention as defined in claim 4 wherein said charging circuit includes a series resistor and wherein said voltage limiting means is a Zener diode.

6. The invention as defined in claim 2 wherein said discharging circuit includes a first resistor connected across the input of said controlled rectifier and a second resistor connected across said source whereby said capacitor is partially discharged between voltage pulses when the mechanically actuated switch is closed and whereby the capacitor is discharged when the engine is turned off.

7. The invention as defined in claim 6 including a second capacitor connected across said source for recharging the first mentioned capacitor between pulses when said mechanically actuated switch is closed.

8. The invention as defined in claim 3 wherein said diode rectifier has its anode connected to the output terminal of the magneto and the cathode of the controlled rectifier is connected to ground, and wherein said mechanically actuated switch is connected across the input of the controlled rectifier by direct connection from ground to a point between the capacitor and the gate of the controlled rectifier.

9. The invention as defined in claim 3 wherein the anode of the diode rectifier is connected to ground and the cathode of the controlled rectifier is connected to the output terminal of said magneto, said circuit including second and third diode rectifiers connected back to back with common cathodes between said output terminal and a point intermediate said capacitor and the gate of the controlled rectifier, and wherein said mechanically actuated switch is connected between said output terminal and the junction of the cathodes of said second and third rectifiers whereby said second and third rectifiers steer the short circuit current in the event of grounding one of the terminals of said mechanically actuated switch.

* * * * *